United States Patent
Andersson

Patent Number: 5,197,010
Date of Patent: Mar. 23, 1993

[54] APPARATUS FOR CONTINUOUSLY ACTIVELY BALANCING ROTORS

[75] Inventor: Anders O. Andersson, Seattle, Wash.

[73] Assignee: The Boeing Company, Seattle, Wash.

[21] Appl. No.: 626,977

[22] Filed: Dec. 13, 1990

[51] Int. Cl.$^5$ ............................................. G01M 1/38
[52] U.S. Cl. ...................................... 364/463; 73/457
[58] Field of Search ...................... 364/508, 566, 463; 73/455, 457, 458, 469, 472, 485, 487, 460

[56] References Cited

U.S. PATENT DOCUMENTS

| | | | |
|---|---|---|---|
| 4,053,123 | 10/1977 | Chadwick | 73/455 X |
| 4,543,825 | 10/1985 | Schönfeld et al. | 73/459 |
| 4,894,787 | 1/1990 | Flannelly et al. | 364/508 |
| 4,937,758 | 6/1990 | Hayden et al. | 364/508 |
| 4,977,516 | 12/1990 | Shepherd | 364/508 |
| 5,067,349 | 11/1991 | Hirchert | 73/472 |

FOREIGN PATENT DOCUMENTS 3739065  5/1989  Fed. Rep. of Germany ........ 73/472

Primary Examiner—Thomas G. Black
Attorney, Agent, or Firm—Christensen, O'Connor, Johnson & Kindness

[57] ABSTRACT

Apparatus for continuously actively balancing rotors by controlling the mass-distribution of a rotor (24) relative to an axis-of-rotation (27) about which the rotor rotates in a stator (26) is disclosed. The mass-distribution of the rotor is adjustable via a hydraulic subsystem (23) that can move the rotor relative to the axis-of-rotation. An electronic subsystem (22) controls the hydraulic subsystem (23) with control signals. More specifically, the sensors (100) of a sensor subsystem (21) sense the repetitive vibrations caused by an unbalanced rotot. The electronic subsystem (22) cyclically updates the control signals applied to the hydraulic subsystem (23) so as to reduce the sensed vibrations, i.e., to balance the rotor (24). The hydraulic subsystem (23) adjusts the position of the rotor (24) by varying the flow of a viscous fluid between the perimeter of a portion of the rotor (24) and an annular sleeve (34) encompassing that portion of the rotor. The annular sleeve (34) rotates with the rotor (24). The rotor (24) is suspended in the annular sleeve by the flowing viscous fluid (40). Ducts (66,70,72,74) in the rotor (24) lead to ports (42,60,62,64) on the rotor through which the fluid (40) between the rotor (24) and the sleeve (34) is supplied and drained. The flow of the fluid (40) through the ducts is controlled by a hydraulic pressure source (75) which is directly coupled to the rotor ducts (66,70,72,74) or through a hydraulic commutator. The flowing fluid (40) may be confined in a single elastic bladder (88) separating the rotor and the sleeve, or the fluid can be contained in four individual bladders in which the pressures are varied to adjust the position of the rotor. Alternatively, rather than using fluid flow or pressure to control the position of the rotor, the rotor can contain cavities (90,92,94,96) in which a mass of fluid is housed. The amount of fluid in the cavities is controllable to control the balance of the rotor.

41 Claims, 6 Drawing Sheets

APPARATUS FOR CONTINUOUSLY ACTIVELY BALANCING ROTORS

TECHNICAL AREA

This invention is directed to rotors and, more particularly, to apparatus for balancing rotors.

BACKGROUND OF THE INVENTION

As used herein the term "rotor" means a device designed to rotate continuously, such as the rotating portion of an electric, hydraulic or pneumatic motor, the shaft of a motor or other mechanical mechanism, an idler shaft, a drive shaft, etc.

An unbalanced rotor, i.e., a rotor having a mass distribution that is unbalanced relative to the axis-of-rotation of the rotor, can cause structural vibrations. In addition to undesirable noises, the structural vibrations resulting from an unbalanced rotor cause fatigue in the rotating machine and any structure to which the rotor is coupled. Normally, the rotors of rotating machines are balanced during their manufacture. Unfortunately, under some circumstances, rotors can become unbalanced. When a rotor becomes excessively unbalanced, it must be rebalanced. The classical way of balancing rotors consists of adding and/or removing weights at particular rotor axial locations so as to make the rotor symmetric, in terms of mass, about the rotor's axis-of-rotation. Such balancing techniques can be costly and time-consuming. Further, such balancing techniques can result in a rotor which is only balanced for a particular set of operating conditions. More specifically, the balance of some rotors varies with rotational frequency. Classical balancing does not take rotational frequency variations into consideration. Rather, balancing is carried out at a specific rotational frequency, which means that the rotor may be unbalanced at other frequencies.

Take, for example, the balancing of the shafts of jet engines in an aircraft. While jet engine shafts are balanced when manufactured and during periodic maintenance of the aircraft, new imbalances frequently develop due to such things as minor damage to the turbine blades of the jet engines. Imbalances in jet engine shafts produce repetitive vibrations in jet engine housings, engine mounts, and the wings and fuselage of the associated aircraft. Repetitive vibrations cause fatigue in components of an aircraft, which reduces the life of the aircraft and could result in an in-flight disaster. Further, the repetitive vibrations resulting from shaft imbalances affect jet engine auxiliary and suspension equipment such that these components require regular maintenance. In addition to affecting safety and maintenance cost, repetitive vibrations produced by unbalanced jet engine shafts create noise in the passenger cabin of the aircraft. Current procedures for rebalancing jet engine shafts are very costly. Also, the balancing procedures only balance jet engines for certain operating conditions, e.g., a certain combination of temperature and rotational frequency.

In the past, passive means have been utilized to reduce the effect of unbalanced rotors. For example, vibration absorbing suspension systems have been used to mount rotating machines. Such suspension systems can considerably reduce the effect of an unbalanced rotor on surrounding structure. Unfortunately, vibration absorbing suspension systems can introduce additional problems, such as allowing relative motion betwen a rotating machine and the structure to which it is fixed when subjected to static and slow dynamic loads.

Neither manually rebalancing the rotational elements of rotating machines or using passive means to reduce the effect of imbalances is completely satisfactory. In between rebalancing, rotating machines operate with any imbalances developed since the most recent rebalancing. Further, rebalancing may be only effective for a given set of operating conditions. Passive means can counter the effect of imbalances in rotors, but there is a limit to the effectiveness of passively reducing the effect of imbalanced rotors. The present invention provides an apparatus for continuously actively balancing a rotor by automatically controlling the mass distribution of the rotor relative to the axis-of-rotation about which the rotor rotates. The active system iteratively improves the balance of the rotor whether or not changes occur in operating conditions.

SUMMARY OF THE INVENTION

In accordance with this invention, an apparatus for continuously actively balancing a rotor by controlling the mass distribution of the rotor relative to the axis-of-rotation about which the rotor rotates in a stationary support, i.e., a stator, while the rotor is rotating is provided. The apparatus includes a sensor subsystem, an electronic subsystem and a hydraulic subsystem. The sensor subsystem includes sensors positioned to sense the vibrations generated by the rotor of a rotating machine. Samples of the sensed vibrations are applied to the electronic subsystem. The electronic subsystem generates control signals for the hydraulic subsystem which controls the mass distribution of the rotor. The control signals are cyclically updated to improve the balance of the rotor. Each update cycle is begun by sensing the vibrations with the sensors. Based upon the amplitude and phase of the sensed vibrations, the electronic subsystem calculates updates for the control signals applied to the hydraulic subsystem so as to further reduce the sensed vibrations.

The hydraulic subsystem comprises a hydraulic pressure source, ducts, a hydraulic commutator, and a rotor balancer built into the rotating machine. In one form of the invention, the rotor balancer is a hydraulic rotor positioner that radially shifts the position of the rotor relative to the rotor axis-of-rotation. In this form of the invention the rotor is coupled to each rotor supporting bearing via an annular sleeve that surrounds the portion of the rotor aligned with the bearing and rotates with the rotor. The sleeve is held in the bearing in a manner that prevents radial translation of the sleeve relative to the axis-of-rotation. The annular sleeve loosely fits the rotor such that a circumferential cavity is formed between the rotor and sleeve. The rotor is suspended in the sleeve by a viscous fluid. Preferably, the fluid has a high coefficient of viscosity. The fluid flows around the circumferential cavity, entering and leaving via one or more pairs of opposed ports that open into the cavity. The electronic subsystem controls the position of the rotor vis-a-vis the sleeve by controlling the port pressure, i.e., the pressure applied to the fluid at each port. Because the ports are opposed, fluidic pressure differentials can be applied to the circumference of the rotor. The fluidic pressure differentials control the position the rotor within the sleeve and, thus, the position of the rotor mass relative to the rotor axis-of-rotation. The location of the rotor axis-of-rotation is determined by the position of the bearings, which are immovably mounted in the stator. Fluidic ducts in the rotor couple the ports to a hydraulic commutator, which is connected to the hydraulic pressure source, which is stationary, i.e., not rotating. The hydraulic commutator allows fluid to flow between the stationary hydraulic pressure source and the rotor ducts. Hydraulic pressure is controlled by controlling the pumps and valves used to create the hydraulic pressure source.

In accordance with further aspects of the present invention, the hydraulic rotor positioner includes an elastic bladder mounted in the circumferential cavity that separates the rotor and the loose fitting sleeve. The bladder houses the fluid that fills the circumferential cavity. The fluid is supplied to and drained from the bladder through the rotor ports, which open into the bladder. The flowing fluid creates fluidic pressure differentials in the bladder, which contracts and expands on opposite sides of the rotor to adjust the position of the rotor within the sleeve and, thus, the position of the rotor mass with respect to the rotor axis-of-rotation. The end result is control of the mass distribution of the rotor relative to the axis-of-rotation.

In accordance with still further aspects of the invention, the hydraulic rotor positioner comprises four individual bladders placed in the circumferential cavity formed by the rotor and the sleeve. The bladders are elastic and are distributed at equal radial positions about the circumference of the rotor, i.e., the bladders are separated by 90°. Through a port opening into each bladder, the hydrostatic pressure created by the fluid in each bladder is controlled. By controlling the pressures in the bladders, the position of the rotor within the sleeve and, thus, with respect to the rotor axis-of-rotation, is controlled.

In another form of the invention, the rotor balancer is a hydraulic mass balancer. In the hydraulic mass balancer form of the invention, the rotor is tightly mounted in bearings and, thus, is prevented from radially translating relative to the axis-of-rotation. Rather than using fluid pressure to forcibly adjust the position of the rotor, the rotor contains cavities. The mass of fluid in the cavities is controlled to balance the rotor. Preferably, the rotor contains two cavities symmetrically distributed about the rotor's axis-of-rotation. The mass of fluid in each cavity is controlled via a port that opens into the cavity. The ports are coupled to hydraulic pumps via ducts and a hydraulic commutator. Preferably, each cavity houses an elastic bladder that, in turn, houses the fluid in the cavity. In such embodiments of the invention, fluid mass is controlled by controlling the pressure applied to the fluid entering the bladder.

As mentioned previously, a system formed in accordance with the invention includes a sensor subsystem, an electronic subsystem and a hydraulic subsystem. In order to maintain and improve balance, the electronic subsystem cyclically updates the control signals that control the hydraulic subsystem. More specifically, the electronic subsystem determines the amplitude and phase of each sensor signal produced by the sensor subsystem. Based upon the sensed amplitudes and phases, the electronic subsystem updates the control signals so as to reduce the sensed vibrations, i.e., to further balance the rotor. This process of updating the control signals is cyclically repeated. The preferred control method allows the electronic subsystem to control the balance of either a single rotating machine or a plurality of rotating machines. In either case, the mass distribution of a single rotor may be controlled with multiple rotor balancers positioned along the axis-of-rotation of the rotor (i.e., multiple hydraulic rotor positioners or multiple hydraulic mass balancers). Using the preferred control method, the controller simultaneously controls each of the rotor balancers.

As will be appreciated from the foregoing brief summary, a system for continuously actively balancing a rotor by controlling the mass distribution of the rotor relative to the axis-of-rotation about which the rotor rotates is provided by this invention. The system of the present invention continuously modifies the mass distribution of the rotor relative to the axis-of-rotation. The mass distribution of the rotor is cyclically refined to optimize the balance of the rotor and, thereby, minimize vibrations caused by the rotor.

As will also be appreciated from the foregoing brief summary, the system of the present invention is useful for maintaining the balance of the rotor of a rotating machine over an extended period of time. The system increases the length of time over which a rotating machine can be operated without requiring manual labor to rebalance the rotor. Further, the system sustains the balance of the rotor between rotor maintenance.

As will be further appreciated from the foregoing brief summary, the system of the present invention provides balancing of the rotor of a rotating machine under various sets of operating conditions. Conventional methods of manually rebalancing rotors only balance the rotor for a specific set of operating conditions. Because the system of the present invention cyclically updates the mass distribution of the rotor, the rotor remains balanced as operating conditions change.

It will also be appreciated from the foregoing brief summary that alternative hydraulic subsystems can be used to alter the mass distribution of a rotor relative to its axis-of-rotation. In all cases, the hydraulic subsystem includes a hydraulic pressure source that applies pressure to fluid flowing through ducts in a rotor. The hydraulic pressure source can be located in the rotor. Alternatively, the hydraulic pressure can be conveyed from fluid located in stator ducts to ducts located in a rotor by a hydraulic commutator. The rotor ducts are connected to ports opening into cavities in or about the rotor. In one form of the invention, the rotor is held in a loose-fitting sleeve which rotates with the rotor in an annular bearing. The rotor may be suspended in the sleeve with a viscous fluid pressure being applied directly to a cavity located between the sleeve and rotor. Alternatively, the flowing fluid may be contained in a continuous elastic bladder separating the sleeve and rotor. Still alternatively, the position of the rotor may be controlled by two (or more) individual bladders separating the rotor and sleeve. In another form of the invention, the mass of fluid located in cavities in the rotor is used to achieve rotor balance rather than fluid pressure being used to reposition the rotor.

BRIEF DESCRIPTION OF THE DRAWINGS

The foregoing objects and many of the attendant advantages of the invention will become more readily appreciated as the same become better understood by reference to the following detailed description when taken in conjunction with the accompanying drawings wherein.

DETAILED DESCRIPTION OF THE PREFERRED EMBODIMENT

Figure 1A:
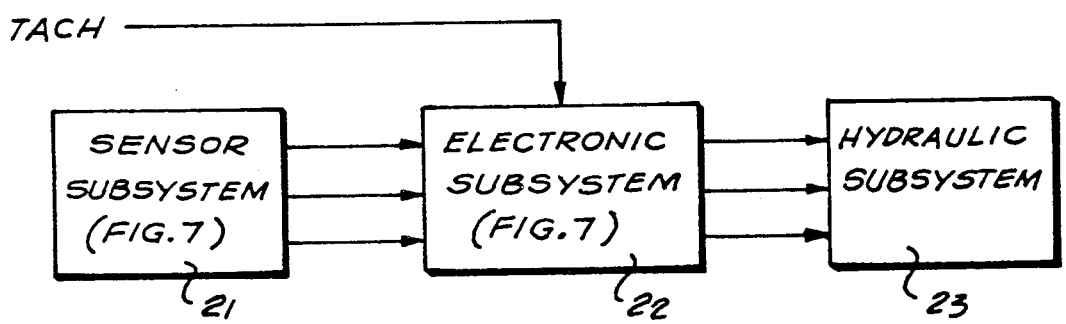
FIG. 1A is a block diagram of an apparatus for the continuous active balancing of rotors formed in accordance with this invention.
Figure 1:
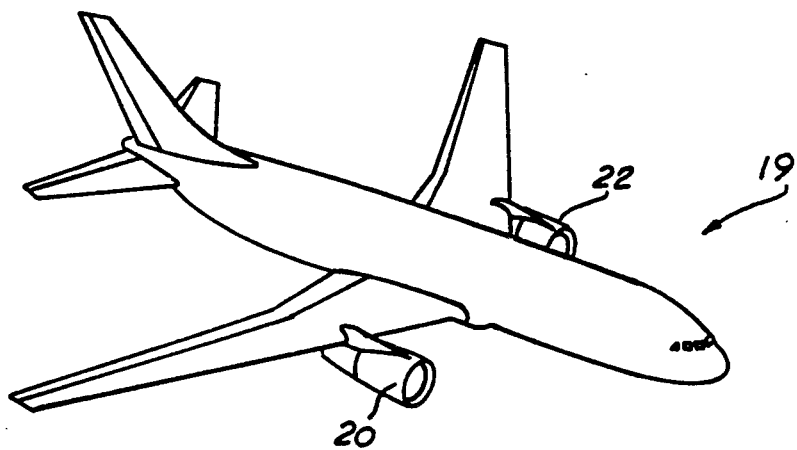
FIG. 1 is a pictorial diagram of an aircraft having jet engines suitable for balancing using a system formed in accordance with the invention.

FIG. 1 is a pictorial diagram of a twin-jet aircraft 19 in which the system of the present invention is useful. The system is useful in balancing the turbine rotors of the jet engines 20 of the aircraft so as to minimize vibrations in the engines, the engine mounts, the wings, and the fuselage. Balancing the jet engines 20 also reduces the repetitive noises generated by the jet engines. As will be better understood from the following description, a system formed in accordance with the invention sustains the balance of the jet engines regardles of changes in operating conditions. For example, the system sustains the balance of the jet engines 20 regardless of their rotational frequency. As will be better understood from the following description, while the invention was designed for use in engines, such as jet engines, it has broader applicability. In general, the invention is useful in any rotating machine, i.e., a machine having a rotating member.

Rotating machines generally comprise a rotating member (the rotor) and a stationary member (the stator). The rotor rotates about an axis-of-rotation that is generally fixed relative to the stator. The rotor is generally a rigid structure and includes a shaft about which other elements of the rotor (if any) are mounted in a balanced arrangement. The longitudinal axis of the shaft is usually aligned with the axis-of-rotation. The stator has a cavity that houses the rotor. The rotor is normally held in the stator by annular bearings that encompass axial sections of the shaft and define the axis of rotation of the shaft.

As shown in FIG. 1A, a rotor balancing system formed in accordance with the present invention includes a sensor subsystem 21, an electronic subsystem 22, and a hydraulic subsystem 23. The hydraulic subsystem 23 controls the mass distribution of the rotor relative to the rotor's axis-of-rotation in accordance with control signals produced by the electronic subsystem 22. More specifically, the sensor subsystem 21 includes one or more sensors positioned to sense repetitive vibrations generated by the rotating machine. Based upon samples of the sensed vibrations, the electronic subsystem 22 calculates updates for the control signals that are applied to the hydraulic subsystem 23, so as to reduce the sensed vibrations. As will be better understood from the following description, the hydraulic subsystem includes a hydraulic pressure source, ducts, a hydraulic commutator, and a rotor balancer. The rotor balancer adjusts the mass distribution of the rotor. According to the invention, the rotor balancer can take two forms: (1) a hydraulic shaft/rotor positioner that shifts the position of the rotating machine's shaft relative to the axis-of-rotation; or (2) a hydraulic mass balancer that uses the mass of a fluid to balance the rotor. In order to more easily understand the operation of the overall system, the rotor balancers are first described.

Figure 2:
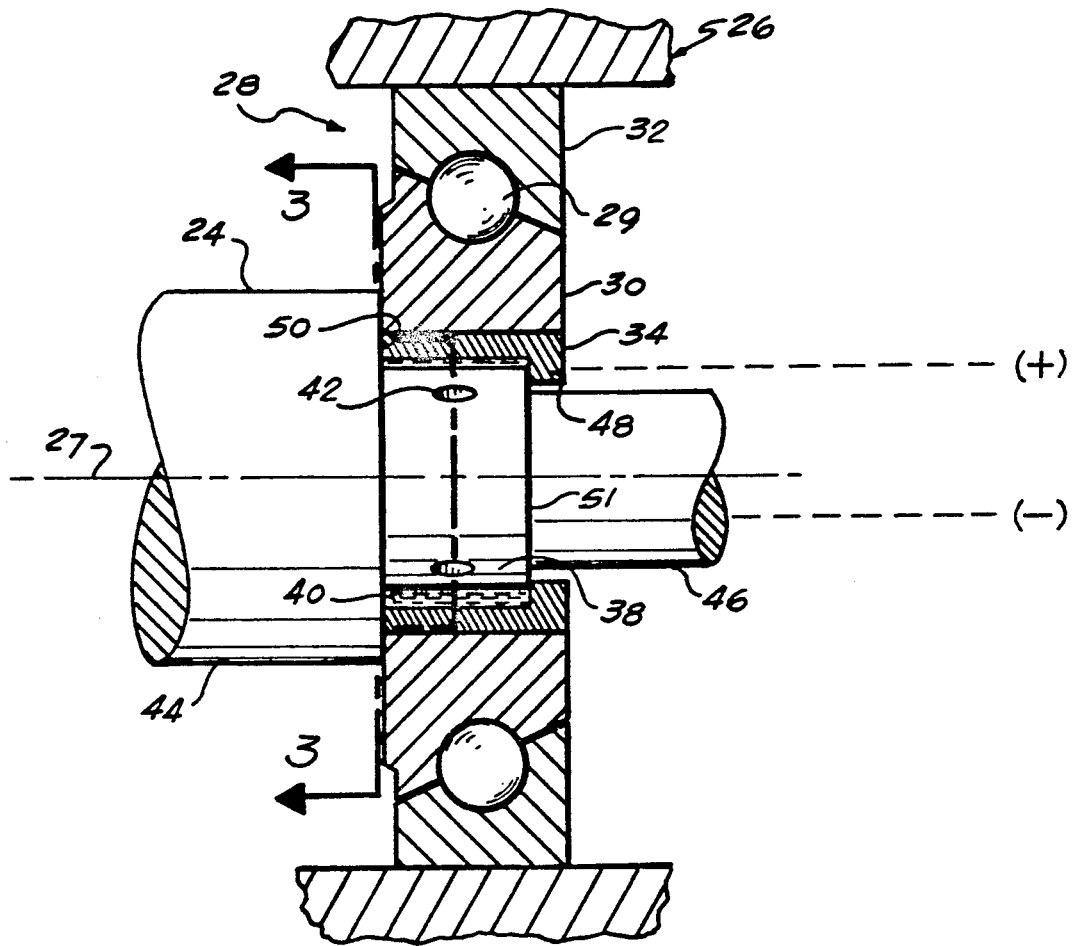
FIG. 2 is a cross-sectional view of a stator and a rotor with the rotor adjustably suspended in a sleeve with a viscous fluid formed in accordance with the invention.

FIG. 2 is a cross-sectional view illustrating a hydraulic shaft positioner form of a rotor balancer formed in accordance with the invention. The shaft 24 of a rotor is shown rotatably mounted in a thrust bearing 28 that, in turn, is mounted in a stator 26. Various thrust bearings exist in the mechanical art. The illustrated thrust bearing 28 comprises ball bearings 29 mounted between an inner race 30 and an outer race 32. The outer race 32 is fixedly mounted in the stator 26. An annular sleeve 34, affixed to the interior of the inner race 30, surrounds the shaft 24. The shaft 24, together with the sleeve 34 and the inner race 30, rotate about an axis-of-rotation 27. More specifically, the illustrated shaft includes two steps. The sleeve 34 is loosely mounted about an intermediate-sized section located between the steps, herein denoted a collar 38. The loose fitting creates a constant-volume annular cavity that allows the collar 38, and thus the shaft, to be shifted radially within the sleeve 34.

Figure 3:
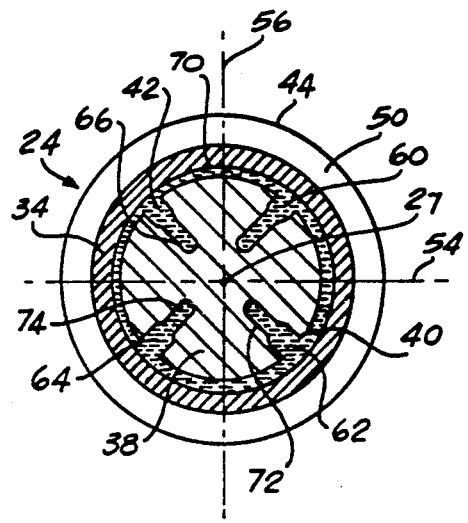
FIG. 3 is a cross-sectional view taken along line 3—3 of FIG. 2.

The constant-volume annular cavity is filled with a fluid 40, preferably a fluid having a high coefficient of viscosity. While highly viscous, the fluid 40 remains hydrodynamic. The viscous fluid 40 enters and leaves the cavity via four ports 42, 60, 62, and 64 located on the exterior of the collar 38. As shown in FIG. 3, the ports are radially separated by equal amounts. The balance of the rotor is modified by adjusting the radial position of the shaft within the sleeve 34 by applying differential fluid pressure to pairs of opposing ports. Because adjusting the radial position of the shaft within the sleeve 34 modifies the mass distribution of the rotor about the axis-of-rotation, the radial position adjustment controls the balance of the rotor. More specifically, the pressure of the fluid 40 generated at the ports 42, 60, 62, and 64 determines via which ports fluid enters the constant-volume annular cavity and via which ports fluid leaves the cavity. The differential fluid pressure controls the radial position of the shaft 24 in the sleeve 34. Because the inner race 30 and the sleeve 34 are fixed radially with respect to the axis-of-rotation 27, only the shaft 24 is moved radially with respect to the axis-of-rotation as port fluid pressure in changed.

The axis-of-rotation 27 is defined by the bearing 28. As mentioned previously, the collar 38 of the shaft 24, which loosely fits in the sleeve 34 so that the shaft can be radially shifted within the sleeve 34, is located between two steps. The steps are formed at the ends of first and second longitudinal sections of the shaft, both of which are cylindrical. The first section 44 has a diameter greater than the diameter of the collar 38. The second section 46 has a smaller diameter than that of the collar 38. The circumferential surface of the first section 44 and the circumferential surface of the collar 38 are joined by a first step 50 that extends radially inward from the first section 44 to the collar 38. The circumferential surface of the collar 38 and the circumferential surface of the second section 46 are joined by a second step 51 that extends radially inward from the collar 38 to the second section 46. One end of the sleeve 34 lies adjacent to the first step 50. The sleeve 34 includes a midsection that spans the width of the collar 38. The other end of the sleeve 34 includes a lip 48 that extends radially inward towards the second section 46 of the shaft. The lip 48 lies adjacent to the second step 51. The constant-volume annular cavity previously mentioned is the circumferential space enclosed by the outer surface of the collar 38, the inner surface of the sleeve 34, the first step 50, and the lip 48. While the geometry of the annular cavity changes when the shaft 24 is shifted in the sleeve 34, the volume of the cavity does not change.

The fluid 40 that fills the annular cavity between the sleeve 34 and the collar 38 is inhibited from seeping out the ends of the sleeve 34 by the lip 48 and the first step 50. Seepage is minimized by the choice of a fluid having a relatively high viscosity coefficient. In addition to minimizing seepage, the choice of a relatively high viscosity fluid 40 has the advantage of inhibiting relative rotational motion between the shaft 24 and the sleeve 34. Contact friction between the first step 50 and the sleeve 34 and between the second step 51 and the lip 48 also inhibits relative rotational motion between the shaft 24 and the sleeve 34.

The shaft positioner of the present invention is useful in rotating machines having shafts with geometric shapes other than that shown in FIG. 2, which is to be considered as illustrative, not limiting. For example, the shaft 24 could have a substantially constant diameter. A section of the shaft would be encompassed by the loose fitting sleeve 34, whose geometry would be modified from that shown in FIG. 2 to coincide with the geometry of the shaft. For example, if the shaft were of substantially constant diameter, two circumferential grooves could be formed in the shaft at positions that coincide with inwardly extending lips located at the ends of the sleeve. Each of the lips would extend into one of the circumferential grooves formed in the surface of the shaft. The annular cavity thusly created would be enclosed by the outer surface of the portion of the shaft between the circumferential grooves, the inner surface of the sleeve, and the inner surfaces of the lips.

FIG. 3 represents a snapshot of the rotating shaft 24 and shows more clearly the annular cavity between the collar 38 and the sleeve 34 occupied by the fluid 40. As noted above, the fluid 40 enters and leaves the annular cavity through four ports 42, 60, 62 and 64. The ports are located at one end of ducts 66, 70, 72, and 74 that run longitudinally through the shaft. More specifically, the ducts 66, 70, 72, and 74 extend radially inward from the ports 42, 60, 62, and 64 to elbows, and then to the fluid source. The fluid source could be located in the rotor, i.e., the shaft. Alternatively, the ducts could extend longitudinally through the shaft to the hydraulic commutator illustrated in FIG. 4 and described below. The commutator couples the rotor ducts to ducts located in the stator. The stator ducts terminate at a hydraulic pressure source 75, which includes conventional items, i.e., pumps, pressure control valves, etc. Regardless of location, the hydraulic pressure source controls the fluid pressure at the four ports such that a differential pressure exists across diagonally opposed ports. As noted above, the pressure differentials forcibly position the shaft within the sleeve 34. For example, if fluid is flowing out of ports 42 and 64 and into ports 60 and 62, the fluid pressure formed in the vicinity of ports 42 and 64 is greater than the fluid pressure in the vicinity of ports 60 and 62. The resulting pressure differential forces the shaft towards the right side of the sleeve 34, as shown in FIG. 3. As a result, the mass distribution of the rotor is moved to the right.

As mentioned previously, preferably the fluid 40 has a high viscosity coefficient to minimize the seepage of fluid out the ends of the sleeve 34. High viscosity fluids are readily available and are known to those skilled in the chemical arts. Conventional oil-based hydraulic fluid, or a high water content polyoxyalkylene fluid (HWCF) with a polyoxyalkylene thickener can be used, for example.

Figure 4:
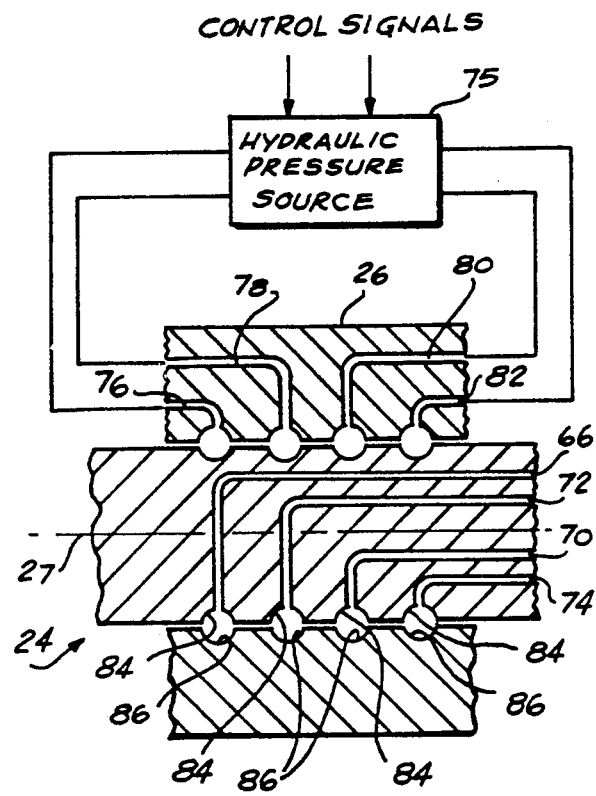
FIG. 4 is a cross-sectional view of a hydraulic commutator taken along a section of a rotor and a stator.

FIG. 4 is a cross-sectional view illustrating a hydraulic commutator suitable for use by the invention. The hydraulic commutator transfers fluid between four ducts 76, 78, 80, and 82 located in the stator 26 and the four ducts 66, 70, 72, and 74 in the shaft 24. Each of the shaft ducts 66, 70, 72, and 74 is coupled to a related one of the stator ducts 76, 78, 80, and 82. For ease of illustration, the shaft ducts 66, 70, 72 and 74 are shown in a common plane even through in an actual embodiment of the invention, for better balance, they would be distributed at equal radial positions as shown in FIG. 3.

As shown in FIG. 4, two sets of four circumferential grooves (channels) 84 and 86 are formed in both the stator 26 and shaft 24. More specifically, one set of grooves is formed on the inner circumferential surface of the stator 26 and the other set is formed on the outer circumferential surface of the shaft 24. The grooves circumscribe the axis-of-rotation 27. One stator groove is aligned with each of the shaft grooves. As a result, each aligned pair of stator/shaft grooves forms an enclosed channel. Fluid is transferred between the stator and rotor via the enclosed channels formed by the circumferential grooves. While FIG. 4 shows circumferential grooves formed in both the shaft and stator, the commutator could be formed by locating grooves in only the shaft or only the stator. For example, if the grooves were only located in the rotor, the stator ducts would terminate at the inner surface of the stator. One of the stator ducts would be aligned with each of the rotor grooves.

As mentioned previously, the flow of fluid in the ducts is controlled by a hydraulic pressure source 75. Preferably, two hydraulic pumps are included in the hydraulic pressure source 75, one to control the fluid pressure in two of the stator ducts 76 and 78 and one to control the fluid pressure in the other two stator ducts 80 and 82, the chosen stator ducts being connected to rotor ducts connected to opposed ports. Depending upon the direction of flow, either duct of each pair could be the return for the pump and the other duct connected to the pump outlet, valves being used to control duct connections.

While high viscosity fluids are desirable for use in the hydraulic shaft positioner illustrated in FIGS. 2 and 3, a low viscosity fluid is more desirable for use in the commutator illustrated in FIG. 4. A low viscosity commutator fluid is desirable because the resistance to movement increases with viscosity. An alternative to making the compromises inherent in these conflicting desires is to use a fluid whose viscosity changes in the presence of an electric or magnetic field. Sleeve 34 would be formed of a permanently magnetized material in an embodiment of the invention in which a magnetic field is used to change the viscosity of a suitable fluid.

Alternatively, an electrorheological fluid can be used. Electrorheological fluids stiffen, i.e., increase in viscosity, in an electric field. If such a fluid is chosen a mechanism for creating an electric field between the collar 38 and sleeve 34 is required. This can be created by simply creating a constant voltage drop across the shaft and sleeve. One way of creating such a voltage drop is to connect a DC voltage source across the shaft and sleeve, as shown by dashed lines in FIG. 2. If the DC source is external to the shaft, it can be connected to wires suitably positioned in the shaft via an electrical commutator. Ferrofluids and electrorheological fluids include particles that have, respectively, a magnetic and an electric orientation such that when the fluids are subjected to a magnetic and an electric field, respectively, the particles of the respective fluids align with the respective fields.

Figure 5:
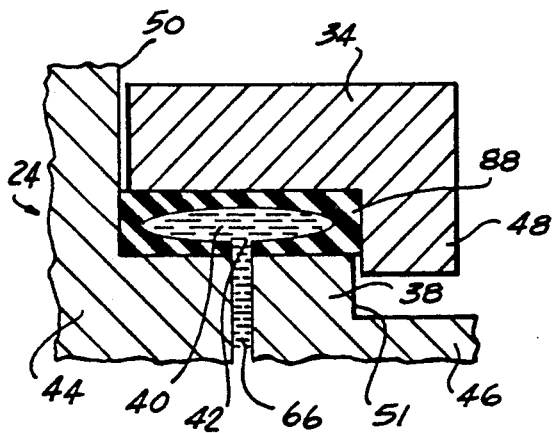
FIG. 5 is a partial, cross-sectional view showing a sleeve and a rotor separated by an elastic bladder containing a fluid.

FIG. 5 is a cross-sectional view of an alternative form of a hydraulic shaft positioner formed in accordance with the invention. Rather than being in direct contact with the sleeve 34 and the collar 38 of the shaft 24, the fluid 40 is housed in an annular bladder. The annular bladder 88 is formed of an elastic material and fills the circumferential cavity between the sleeve 34 and the collar 38. As shown in FIG. 5, the shaft ducts 66, 70, 72, and 74 extend radially outward from the collar 38, into the bladder. As before, the fluid 40 flows in and out of the bladder through the ports located at the ends of the shaft ducts. As in FIG. 3, the magnitude of the pressure causing flow of the fluid 40 into and out of the four ducts determines the magnitude of fluid flow about the annular cavity and the position of the shaft 24 within the sleeve 34. In the form of the invention shown in FIG. 5, because the fluid 40 is sealed in the bladder 38 no fluid leaks out the ends of the sleeve 34. Because the bladder 88 is elastic, pressure differentials created by fluid flow cause certain portions of the bladder to contract and other portions to expand to move the shaft 24 radially within the sleeve 34. Because the fluid 40 is sealed within the bladder 88, a low viscosity fluid is ideal for use in this embodiment of the invention.

In another form of the hydraulic shaft positioner of the invention, which can also be depicted by FIG. 5, rather than filling the circumferential cavity with a single bladder 88, four bladders can be distributed symmetrically about the collar 38. In this case, each of the four shaft ducts extend into a single bladder. In this case, fluid in each bladder does not flow in one port and out another. Rather the fluid is hydrostatic. The hydrostatic pressure in each bladder forcibly positions the shaft 24 within the sleeve 34.

Figure 6:
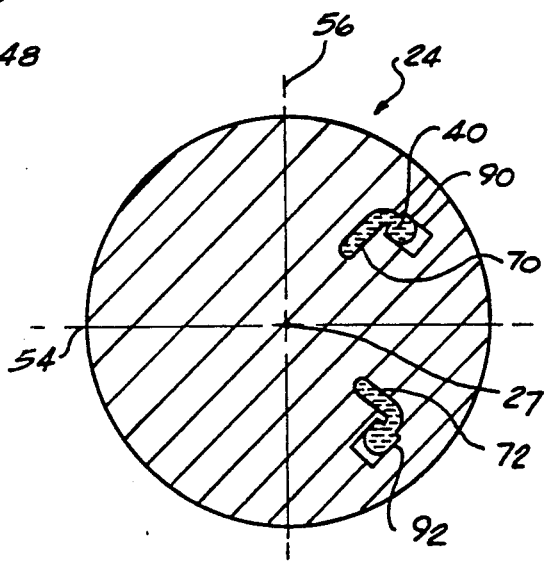
FIG. 6 is a cross-sectional view of an alternative form of the invention showing a rotor containing bladders located in cavities formed in the rotor.

An alternative to the types of rotor balancers illustrated in FIGS. 3 and 5, which are based on shifting the position of a rotor with respect to a stator, is a hydraulic mass balancer. FIG. 6 illustrates a hydraulic mass balancer formed in accordance with the invention. As will be better understood from the following discussion, a hydraulic mass balancer is based on shifting the mass of the shaft without repositioning the shaft.

The hydraulic mass balancer illustrated in FIG. 6 comprises two cavities formed in the shaft 24, each of which includes a bladder 90 and 92. The bladders are elastic and house the fluid 40. The cavities are located equal distances about the shaft's axis-of-rotation 27, at 90° to one another. The bladders are connected to the shaft ducts 70 and 72. As in the other embodiments of the invention, the shaft ducts are coupled to a hydraulic pressure source either located in the shaft or externally. If external, the hydraulic pressure source is coupled to the shaft ducts via a hydraulic commutator and stator ducts.

The mass distribution of the rotor is modified by varying the pressure applied to the fluid in each duct and thereby the mass of fluid in each bladder. More specifically, because the bladders are elastic the volume of fluid in each bladder is determined by the pressure applied to the fluid feeding the bladder. Increasing the pressure applied to the fluid feeding one of the bladders causes the bladder to expand and the volume of fluid in the bladder to increase. Decreasing the pressure applied to the fluid feeding a bladder results in the bladder contracting and the volume of fluid in the bladder to decrease. In addition to the tension of the elastic bladder, the air pressure inside of the cavity exterior to the bladder tends to force fluid out of the bladder when the fluid pressure is decreased. Changes in fluid volume, of course, create mass changes which are used to control the balance of the shaft.

FIG. 6 also shows that the bladders and cavities are preferably oriented such that their longitudinal axes lie perpendicular to radial lines so as to reduce the effect of centrifugal forces on the volume of fluid in each bladder. Such an orientation of the bladders and cavities reduces any tendency of the bladders to expand or contract when the rotational frequency of the shaft is changed. Because the fluid 40 is sealed within the bladders, preferably the fluid has a low coefficient of viscosity. While at least two cavity/bladder combinations are preferred, a hydraulic mass balancer formed in accordance with the invention could consist of four cavity/bladder combinations, forming two pairs located along common diagonal lines. Further, while the inclusion of bladders in the cavities is preferred, in some embodiments of the invention it may be desirable to delete the bladders. In such embodiments, the amount of fluid in the cavities would be controlled by pumping fluid into and sucking fluid out of the cavities. Still further, while FIG. 6 shows the bladders mounted within the shaft, the bladders could be placed outside of the shaft or, for that matter, on or within any part of the rotor.

Figure 7:
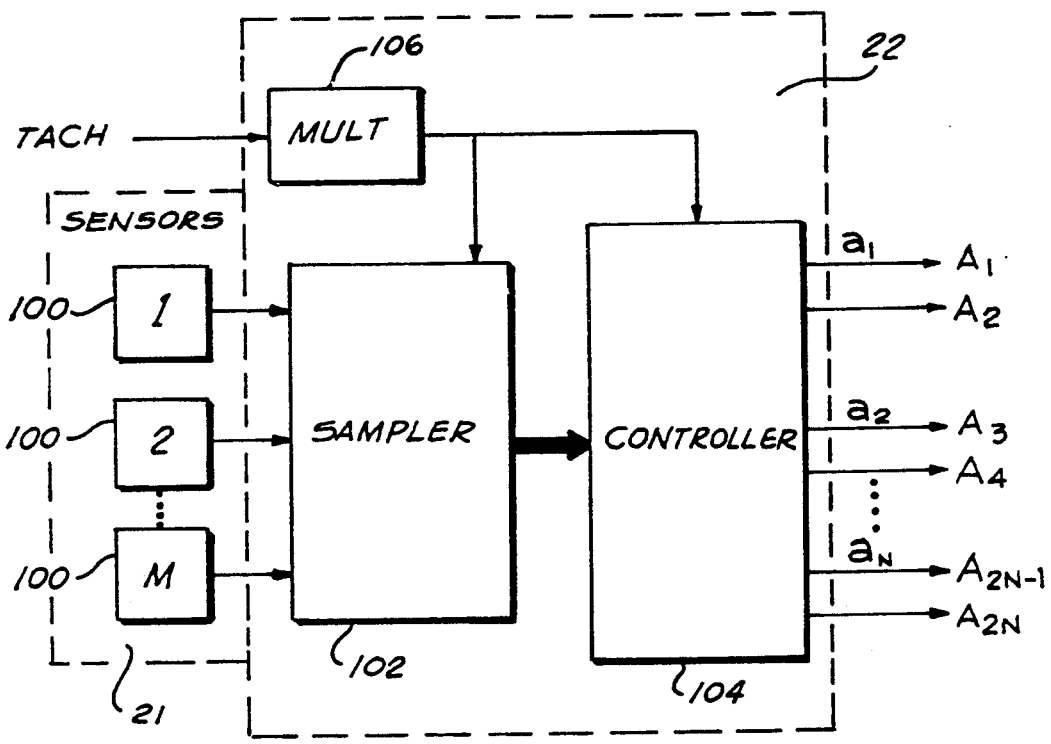
FIG. 7 is a block diagram of a sensor subsystem and an electronic subsystem suitable for use in the apparatus illustrated in FIG. 1A.

FIG. 7 is a block diagram of a sensor subsystem 21 and an electronic subsystem 22 formed in accordance with the invention for controlling one or more hydraulic pressure sources 75 shown in FIG. 4 and, thus, the mass distribution of one or more rotors. In general, the sensor and electronic subsystems illustrated in FIG. 7 sense the vibrations caused by one or more unbalanced rotors and generate control signals that control the operation of the various embodiments of the hydraulic subsystems depicted in FIGS. 2-6 so as to control the mass distribution of the rotor(s) such that the sensed vibrations are decreased.

The electronic subsystem is shown as a multiple input, multiple output (MIMO) system that can be used to control the balance of a single rotor of a single rotating machine, multiple rotors of the same rotating machine or, simultaneously, the balance of one or more rotors of one or more rotating machines by controlling the mass distribution of each rotor. While a single hydraulic subsystem, i.e., hydraulic pressure source, commutator and rotor balancer can be used in some instances to balance a single rotor, in many actual embodiments of the invention each rotor's mass distribution will be controlled by two or more axially spaced-apart rotor balancers of the type previously described herein. For example, if the shaft of a rotor is mounted in two bearings, the position of the shaft in each of the bearings may be varied using a hydraulic shaft positioner of the type shown in FIGS. 2-5. Alternatively, two or more hydraulic mass balancers of the type depicted in FIG. 6 can be used to balance a single shaft, the hydraulic mass balancers positioned at spaced-apart positions along the shaft.

As will be better understood from the following description, each hydraulic subsystem controlled by the MIMO control system illustrated in FIG. 7 receives a pair of control signals, $a_1, a_2, a_3 \ldots a_N$ (hereinafter generally denoted $a_n$). Each control signal pair $a_n$ includes first and second differential signals $A_{2n-1}$ and $A_{2n}$. The differential signals control the orthogonal pressure difference applied to either a hydraulic shaft positioner (FIGS. 2-5) or a hydraulic mass balancer (FIG. 6). Because of the orthogonal signal relationship, in essence, each control signal pair forms a complex number, i.e., a number having a real component and an imaginary component wherein the magnitude of one of the signals ($A_{2n-1}$) defines the magnitude of the real component and the magnitude of the other signal ($A_{2n}$) defines the magnitude of the imaginary component.

Sensor subsystem 21 illustrated in FIG. 7 includes a plurality of sensors 100 and the electronic subsystem 22, i.e., the MIMO control system, includes a sampler 102, a controller 104, and a multiplier 106. The sensors 100 sense the repetitive vibrations caused by the unbalanced rotating machine(s) at a plurality of locations. The sampler 102 samples the analog signals produced by the sensors. The rate of sampling is controlled by a tachometer signal multiplied by a predetermined magnitude by the multiplier 106. The controller 104 receives the output of the sampler 102, analyzes the sampled signals, and produces the one or more pairs of differential control signals $A_1/A_2, A_3/A_4 \ldots A_{2N-1}/A_{2N}$ that control the application of fluid to the rotor balancer(s). As noted above, each control signal $A_1, A_2, A_3, A_4 \ldots A_{2N}$ defines the pressure difference between two diagonally opposite ports of a rotor balancer.

While one sensor 100 can be used in an actual embodiment of the invention, preferably a plurality of sensors are used, with a subset of the sensors being located near each rotating machine whose rotor is to be balanced so that the repetitive vibrations produced by each rotating machine are sensed. The preferred form of the sensors are accelerometers coupled to each rotating machine to sense the structural vibrations developed in the rotating machines. Alternatively, the sensors 100 could be microphones positioned to sense the repetitive noise caused by unbalanced rotating machines. For example, if the rotating machines are the jet engines of an aircraft, the sensors could be microphones located in the passenger cabin of the aircraft positioned to sense the repetitive noise generated by the jet engines. In any case, the sensors 100 each produce an analog signal representing the vibration occurring at the sensor's location.

The sampler 102 samples the analog signal produced by the sensors 100 and produces corresponding digital signals. The sampling of the sensor signals is preferably synchronized with the rotation of one of the rotating machines. For example, the tachometer signal multiplied by the multiplier 106 could be produced by a tachometer monitoring one of the rotating machines. As a result, the multiplied tachometer signal 106 would be a pulse train synchronized to the rotating machine.

A number of samples of each of the sensor signals are taken so that an accurate representation of the repetitive vibration at each sensor location is produced. For example, each sensor signal could be sampled for one or more periods of the repetitive vibrations. Preferably, the sensors would be sampled simultaneously. The digital signals produced by the sampler 102 are applied to the controller 104. The controller includes a microprocessor, suitable temporary and permanent memory and other necessary components familiar to those skilled in microprocessor system design.

The controller determines the amplitude and phase of a frequency component of each digital signal, preferably the fundamental frequency component. The fundamental frequency is preferably based on the multiplied tachometer signal 106, which the controller 104 receives. The amplitudes and phases could be determined, for example, by the controller 104 performing a Fast Fourier Transform on each of the digital signals. The amplitudes and phases determined by the controller 104 are stored in the memory of the controller. Based upon the amplitudes and phases of the sensed vibrations, the controller calculates updates for the differential control signals $A_1, A_2, \ldots A_{2N}$, in the manner illustrated in FIG. 8 and described next.

Figure 8:
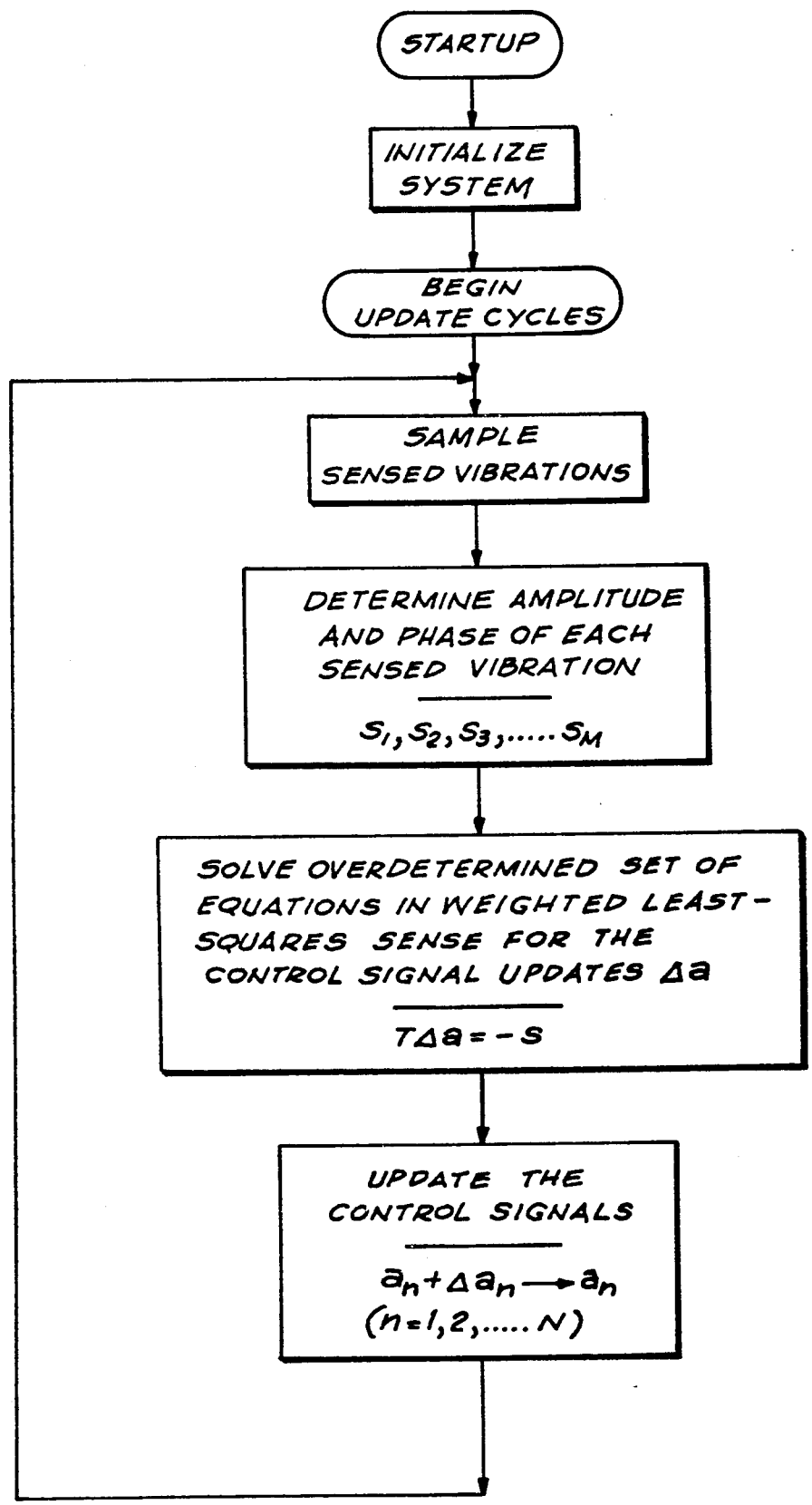
FIG. 8 is a flow diagram illustrating a method according to the invention of operating the controller of the electronic subsystem illustrated in FIG. 7.

FIG. 8 illustrates a method of cyclically updating the control signals $A_1, A_2, \ldots A_{2N}$ (hereinafter generally denoted $A_n$) to improve or maintain the balance of the rotors. During each update cycle all of the control signals $A_n$ are updated. The cyclic update method begins by initializing the controller, which comprises determining initial values for the control signals $A_n$. Preferably, the initial control signal values are stored in the controller and retrieved during initialization. The stored values can be equal values or the value of control signals derived during the most recent operation of the rotor balancing system. Alternatively, some other method can be used to determine initial control signal values. System initialization may also include determining how changes in the control signals affect the repetitive vibrations generated by the rotating machines, i.e., initialization may include a system response analysis.

After initializing the system, update cycles are cyclically performed to maintain or further the reduction of the sensed vibrations by improving the balance of the rotating machines. The update cycles are begun by receiving a set of sensed vibration samples generated by the sampler 102. The controller analyzes each sensed vibration sample to determine its amplitude and phase. The amplitudes and phases are hereinafter represented by complex numbers denoted $s_m$. More specifically, for a particular sensor m, the complex number $s_m$ represents the amplitude and phase of a frequency component, preferably the fundamental frequency component, of the repetitive vibration sensed by that sensor m. As noted above, the amplitude and phase of the signals may be determined by performing a Fast Fourier Transform on each of the signals.

The complex numbers $s_m$ are used to calculate updates for the control signals $A_n$. The updates are calculated by solving the following matrix equation:

$$T\Delta a = -s \qquad (1)$$

In Equation (1), T is a matrix of complex numbers relating changes in the control signals $A_n$ to changes in the amplitudes and phases $s_m$ of the sensed vibrations. $\Delta a$ is a N-by-1 vector of complex numbers representing updates for the control signals $A_n$. The nth element of the vector $\Delta a$ is a complex number $\Delta a_n$ representing the updates for the control signals $A_{2n-1}$ and $A_{2n}$. The real part of the complex number $\Delta a_n$ represents the update for the control signal $A_{2n-1}$, and the imaginary part of the complex number $\Delta a_n$ represents the update for the control signal $A_{2n}$. The M-by-1 vector s contains the complex numbers $s_m$ representing the amplitudes and phases of the sensed vibrations. The mth element of the vector s is the complex number $s_m$.

The matrix T models the effect of changes in the control signals $A_n$ on the amplitude and phases $s_m$ of the sensed vibrations. The element in the mth row and nth column of the matrix T models the effect of changes $\Delta a_n$ in the control signals controlling the nth rotor balancer on the amplitude and phase $s_m$ of the vibration sensed by the mth sensor, according to the following equation:

$$T_{m,n} = \Delta s_m / \Delta a_n \qquad (2)$$

In Equation (2), $\Delta s_m$ represents the change in the amplitude and phase of the vibration sensed by the mth sensor following changes $\Delta a_n$ in the control signals applied to the nth rotor balancer. The transfer function matrix T can be determined as described hereinafter.

The update cycle is completed by updating the control signals $A_n$ as shown in the following equation:

$$a_n + \Delta a_n \to a_n \qquad (3)$$

In Equation (3), $a_n$ is a complex number representing the control signals applied to the nth rotor balancer according to the following equation:

$$a_n = A_{2n-1} + jA_{2n} \qquad (4)$$

$A_{2n-1}$ and $A_{2n}$ are scalars representing the control signals applied to the nth rotor balancer, and j is the square root of $-1$. All of the output complex amplitudes $a_n$ are updated in this manner. The next update cycle is then begun.

Methods of solving matrix equations such as Equation (1) are known by those skilled in linear algebra. Preferably, the number of sensors, M, is greater than the number of rotor balancers, N. With such a preferred number of sensors, the matrix Equation (1) represents more equations than unknowns, i.e., the set of equations is over-determined. The over-determined matrix Equation (1) can be solved in a weighted least-squares sense, which is well known to those skilled in the linear algebra art.

Figure 9A:
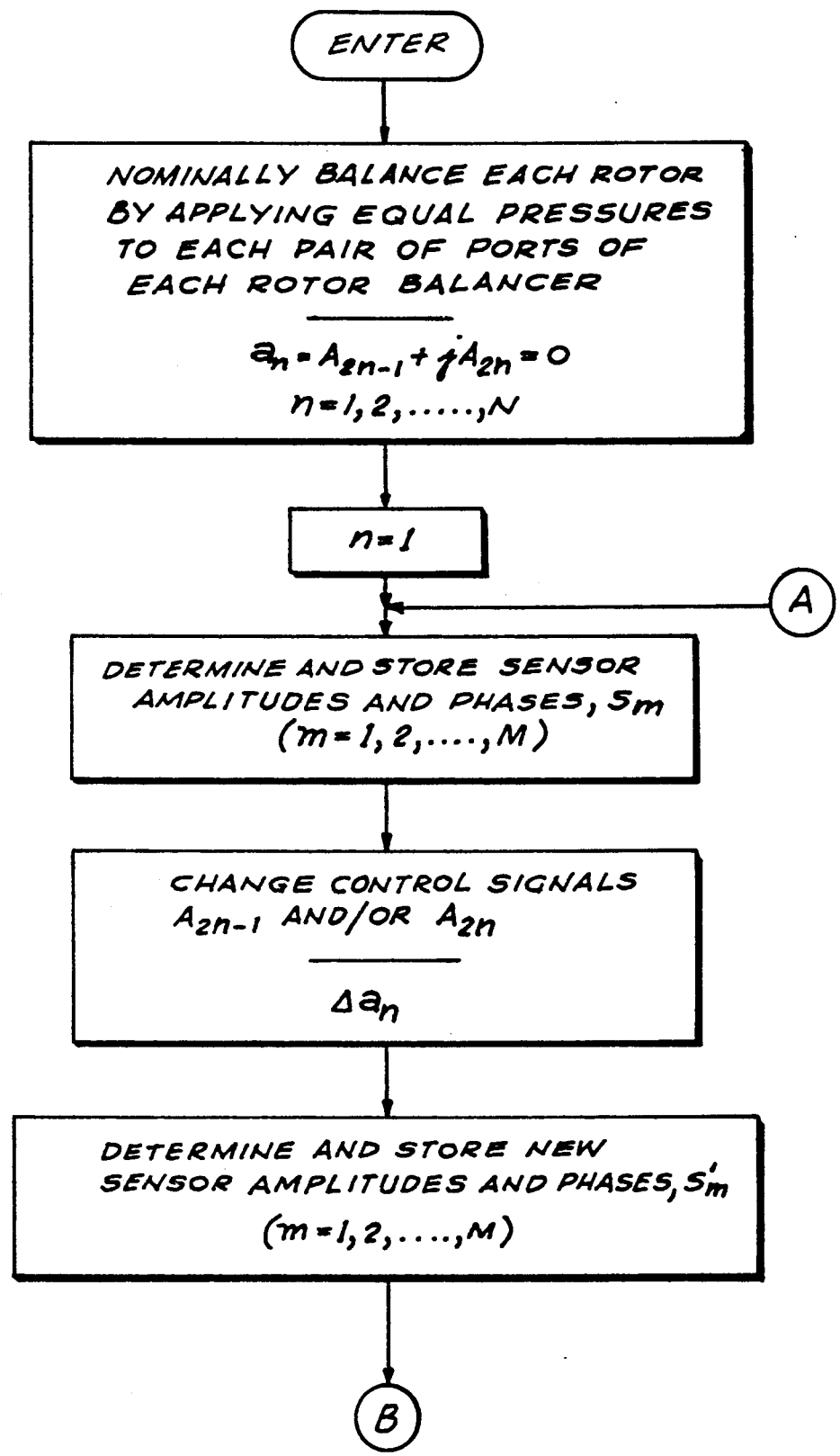
FIGS. 9A and 9B are flow diagrams of a method of obtaining transfer function values used in the method illustrated in FIG. 8.
Figure 9B:
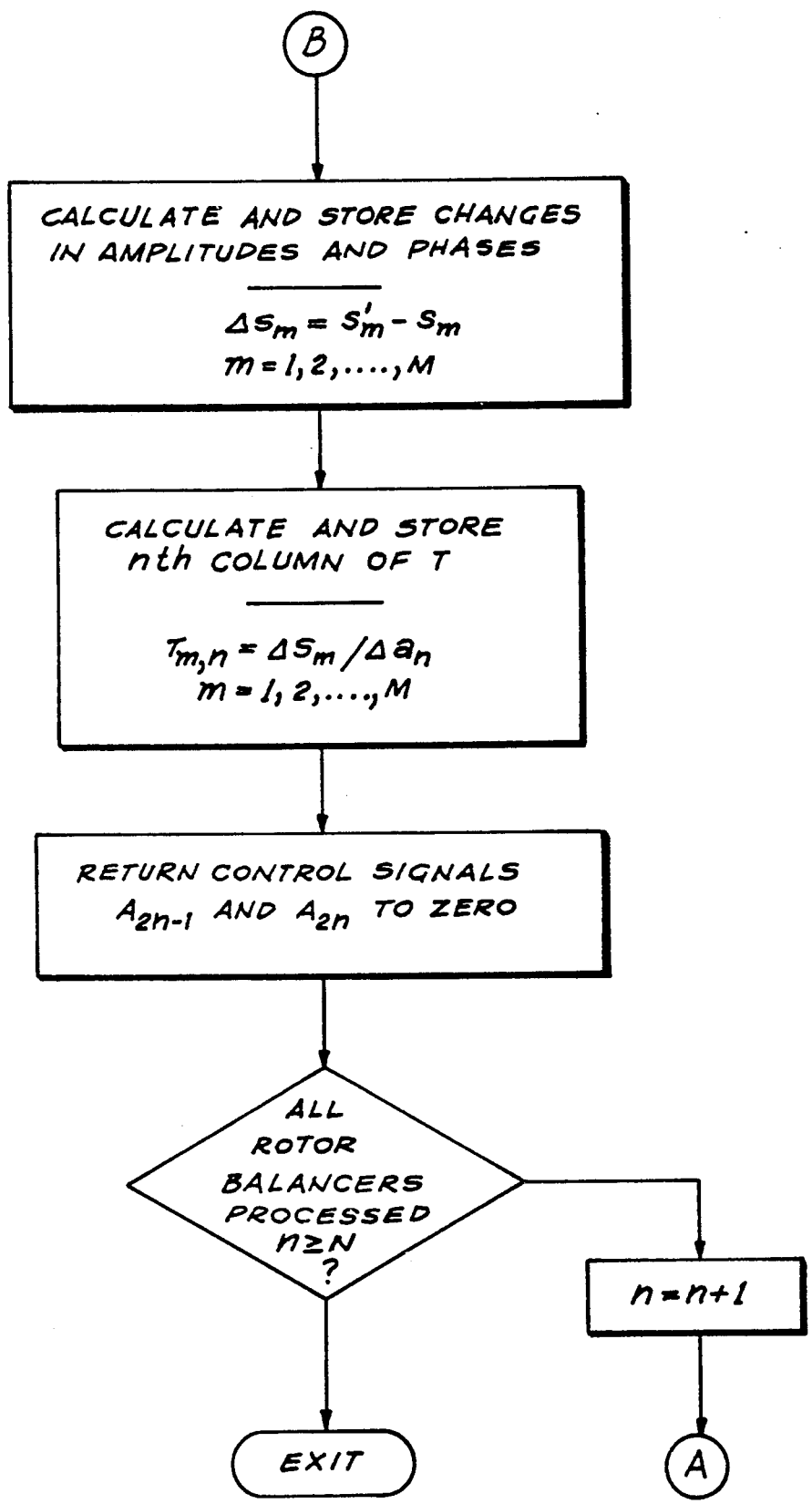

FIG. 9 is a flow diagram illustrating a method of determining the transfer function matrix T. Each column of the transfer function matrix T is determined by individually changing the control signals applied to a particular rotor balancer and measuring the subsequent changes in the amplitudes and phases of the sensed vibrations. The method is begun by nominally balancing each rotor. Equal fluid pressures are applied to each pair of ports of the rotor balancers. That is, equal pressures are applied to each pair of diagonally opposite ports. Thus, the control signals $A_1$, $A_2$, ..., $A_{2N-1}$, $A_{2N}$ are all zero. n is initialized to one and the first column of the transfer function matrix T is calculated as follows. The amplitude and phase pair represented by the complex number $s_m$ is determined for each sensed vibration. The control signals applied to the nth rotor balancer, represented by the complex number $a_n$, are changed by changing the control signal $A_{2n-1}$ and/or the control signal $A_{2n}$. In essence, a fluid pressure difference is applied to one or both of the pairs of diagonally opposite ports of the rotor balancer. Following changing the control signals, the sensed vibrations are sampled and the new amplitude and phase pair, $s'_m$, is determined for each sensor, m. The change in each amplitude and phase pair is then calculated and stored in the controller, according to the following equation:

$$\Delta s_m = s'_m - s_m \qquad (5)$$

The elements of the nth column of the transfer function matrix T are then calculated individually based upon the change in the control signals applied to the nth rotor balancer and the subsequent changes in the sensed vibrations as shown in the following equation:

$$T_{m,n} = \Delta s_m / \Delta a_n \qquad (6)$$

The control signals represented by the complex number $a_n$ are then returned to zero, so that there is no fluid pressure difference between both pairs of diagonally opposite ports of the nth rotor balancer. If all rotor balancers have not been processed, n is incremented by one and the control signals applied to the next, n, rotor balancer are changed so that the next column of the transfer function matrix T can be determined in the same manner. This process is repeated until all rotor balancers have been processed, i.e., all columns of the transfer function matrix T have been determined. As described hereinafter, the transfer function matrix T can be subsequently updated during the operation of the rotor balancing system. Also as described hereinafter, values for the transfer function matrix T can be determined for various operating conditions and the transfer function matrices can be stored in the controller. Alternatively, theoretical transfer functions based on a dynamic system model can be used.

As described previously, preferably, a rotor balancer according to the present invention includes four ports. The control signals control the difference between the fluid pressure applied to diagonally opposite ports of the rotor balancer. The control signal $A_{2n-1}$ determines the pressure difference between two of the diagonally opposite ports and the control signal $A_{2n}$ controls the pressure difference between the other two diagonally opposite ports. Alternatively, if the rotor balancer takes a form that includes two ports, i.e., two bladders orthogonally located within the shaft (FIG. 6) or exterior to the shaft (FIG. 5), the control signal $A_{2n-1}$ would determine the absolute fluid pressure in one of the bladders and the control signal $A_{2n}$ would control the pressure in the other bladder. Thus, in this case, the control signals represented by the complex numbers $a_n$ would represent absolute fluid pressures as opposed to fluid pressure differences.

The cyclic method shown in FIG. 8 can be enhanced in many ways. The cyclic method can be enhanced by using one of the methods of operation of the frequency-domain vibration controller described in U.S. patent application Ser. No. 07/575,223, filed Aug. 30, 1990, entitled "Method and Apparatus for Actively Reducing Repetitive Vibrations" by Anders O. Andersson et al. and assigned to the assignee of the present application, the subject matter of which is incorporated herein by reference. In order to avoid unduly complicating the description of the present invention, only a brief description of the methods of operation of the frequency-domain vibration controller described in the foregoing patent application is presented here.

The foregoing patent application discloses a frequency-domain vibration controller that actively controls repetitive vibrations by introducing opposing vibrations. The amplitudes and phases of the opposing vibrations are determined using a method somewhat similar to the method shown in FIG. 8. Amplitude and phase updates of the opposing vibrations are calculated using a matrix equation similar to Equation (1). As discussed in the patent application, a transfer function matrix, T, used by the frequency-domain vibration controller can change with operating conditions. Prior to calculating updates, the transfer function matrix T is updated based upon: (1) the previous response characteristics of the sensed vibrations to changes in the opposing vibrations; and (2) the current elements of the transfer function matrix T. Updating of the transfer function matrix makes the control system more adaptive to changes in the operating conditions.

The transfer function matrix T used in the present invention can also vary with operating conditions. The adaptive method for updating transfer function matrices disclosed in the foregoing patent application can be used to update the transfer function matrix T used in the present invention. As a matter of fact, in many environments, it may be preferable to update the transfer function matrix T prior to calculating the control signal updates.

Alternatively, as discussed in the foregoing patent application, a plurality of transfer function matrices corresponding to several operating conditions can be stored and used for updating the control signals. During use, multiple estimates of the updates for the control signals are calculated using the stored transfer function matrices corresponding to operating conditions near those that actually exist. Then, the update estimates are interpolated to obtain the updates for the control signals.

In order to minimize any confusion resulting from incorporating the foregoing patent application herein by reference, the most significant difference in how the method of this invention and the method of the foregoing invention are used is briefly described next. The method described in the foregoing patent application calculates complex numbers that are inverse transformed into repetitive time-varying (AC) control vibrations. The control vibrations are applied to a region or structure to reduce noise in the region or structure. In the present invention, the same method can be used to calculate complex numbers $a_n$, whose real $A_{2n-1}$ and imaginary $A_{2n}$ parts are used to form constant (DC) values. The DC values are applied to hydraulic pumps that control the balance of one or more rotors. For example, in the present invention, $A_1$, the real part of the complex number $a_1$, is applied to one of the hydraulic pumps to produce a constant pressure difference between a pair diagonally opposite ports, such as the ports 42 and 62 shown in FIG. 3.

As previously discussed herein, the controller 104 of the present invention can be used to simultaneously balance one or more rotating machines. Further, as required, one or more rotor balancers can be used to balance each rotor. As previously described, in the case of sensed vibrations resulting from multiple rotating machines, the operation of the controller is synchronized with one of the rotating machines, the reference rotating machine. The sampling of the sensed vibrations is synchronized with the reference rotating machine and the fundamental frequency of each sensed vibration is based upon the rotational frequency of the reference rotating machine, or a multiple thereof. However, if the multiple rotating machines operate at slightly different rotational frequencies, this method may not be as effective as desired. One way to improve this method is to incorporate the frequency-domain vibration controller improvement disclosed in U.S. patent application Ser. No. 07/608,971, filed Oct. 31, 1990, entitled "Method and Apparatus for Actively Reducing Multiple-Source Repetitive Vibrations" by Anders O. Andersson et al. and assigned to the assignee of the present invention, the subject matter of which is incorporated herein by reference.

The last referenced patent application discloses a method and apparatus for reducing repetitive vibrations produced by multiple sources operating at slightly different frequencies. As described in the patent application, the control signals used to create opposing vibrations, reducing the undesired vibrations, are frequently updated to account for the differences in the frequencies of the sources. In a similar manner, the method of the present invention could be modified to improve the balancing of multiple machines rotating at slightly different frequencies. More specifically, the output complex numbers $a_n$ calculated using the method of the present invention could be decomposed into elements for each of the rotating machines. Then, the output complex numbers $a_n$ would be frequently recalculated based upon the frequency differences between the rotating machines.

While a preferred embodiment of the invention has been illustrated and described, it will be appreciated that various changes, in addition to those previously mentioned herein, can be made therein without departing from the spirit and scope of the invention. For example, if multiple rotating machines are to be balanced, a separate controller as described herein could be used for each rotating machine. In such a system, each rotating machine would be monitored by sensors coupled closely to that rotating machine so that the vibrations sensed are created substantially entirely by that rotating machine and not by other rotating machines. The use of separate controllers for each rotating machine allows each controller to operate synchronously with the rotating machine to which it corresponds. As a result, differences in frequencies between rotating machines will not degrade the effectiveness of the control system. Thus, within the scope of the appended claims it is to be understood that the invention can be practiced otherwise than as specifically described herein.

The embodiments of the invention in which an exclusive property or privilege is claimed are defined as follows:

1. A system for continuously actively balancing the rotor of a rotating machine comprising:
   (a) rotor balancing means for radially shifting the mass distribution of a rotor relative to an axis-of-rotation about which the rotor rotates, said axis-of-rotation being defined by a stator;
   (b) sensing means for sensing repetitive vibrations generated by said rotating rotor; and
   (c) control means coupled to said sensing means and said rotor balancing means for:
      (i) continuously applying control signals to said rotor balancing means for controlling the mass distribution of said rotor relative to said axis-of-rotation; and (ii) cyclically updating said control signals by:
(1) receiving a repetitive vibration sensed by said sensing means and determining the amplitude and phase of a frequency component of said sensed repetitive vibration;
(2) calculating updates for said control signals using: (a) a transfer function that models the effect of changes in said control signals on the amplitude and phase of said frequency component; and (b) said amplitude and phase of said frequency component; and
(3) using said calculated updates to update said control signals.

2. The system claimed in claim 1, wherein said rotor balancing means includes a hydraulic subsystem comprising:
(a) a hydraulic rotor positioner including:
(i) a sleeve loosely surrounding said rotor and rotatably mounted in said stator, the space between said sleeve and said rotor defining a continuous volume annular cavity;
(ii) a hydrodynamic fluid located in said continuous volume annular cavity;
(iii) a plurality of ports formed in said rotor and opening into said continuous volume annular cavity for supplying fluid to and draining fluid from said cavity; and
(b) a hydraulic pressure source coupled to said plurality of ports and to said control means for controlling the hydraulic pressure applied to the fluid supplied to and drained from said plurality of ports.

3. The system claimed in claim 2, including a bladder mounted in said continuous volume annular cavity.

4. The system claimed in claim 3, wherein said plurality of ports includes at least two pairs of diagonally opposed ports.

5. The system claimed in claim 2, wherein said plurality of ports includes at least two pairs of diagonally opposed ports.

6. The system claimed in claim 1, wherein said rotor balancing means includes a hydraulic subsystem comprising:
(a) a hydraulic rotor positioner inlcuding:
(i) a sleeve loosely surrounding said rotor and rotatably mounted in said stator, the space between said sleeve and said rotor defining an annular cavity;
(ii) a plurality of enclosed geometrically adjustable devices located in said annular cavity between said rotor and said sleeve;
(iii) a hydrostatic fluid located in said plurality of enclosed geometrically adjustable devices; and
(iv) a plurality of ports formed in said rotor, one of said ports opening into each of said plurality of enclosed geometrically adjustable devices for supplying fluid to and draining fluid from said enclosed geometrically adjustable devices; and
(b) a hydraulic pressure source coupled to said plurality of ports and to said control means for controlling the hydraulic pressure applied to the hydrostatic fluid located in said plurality of enclosed geometrically adjustable devices.

7. The system claimed in claim 6, wherein said enclosed geometrically adjustable devices are elastic bladders.

8. The system claimed in claim 7, wherein said plurality of ports includes at least two pairs of diagonally opposed ports.

9. The system claimed in claim 6, wherein said plurality of ports includes at least two pairs of diagonally opposed ports.

10. The system claimed in claim 1, wherein said rotor balancing means includes a hydraulic subsystem comprising:
(a) a hydraulic mass balancer including:
(i) a plurality of cavities located in said rotor;
(ii) a hydrostatic fluid located in said plurality of cavities;
(iii) a plurality of ports formed in said rotor, one of said ports opening into each of said plurality of cavities for supplying fluid to and draining fluid from said plurality of cavities; and
(b) a hydraulic pressure source coupled to said plurality of ports and to said control means for controlling the hydraulic pressure applied to the hydrostatic fluid located in said plurality of cavities and, thus, the mass of hydrostatic fluid located in said plurality of cavities.

11. The system claimed in claim 10, wherein said cavities are volume adjustable.

12. The system claimed in claims 1, 2, 6 or 10, wherein said rotor balancing means includes a hydraulic commutator for transferring fluid between said stator and said rotor.

13. The system claimed in claim 12, wherein said hydraulic commutator comprises:
(a) a plurality of rotor channels equal in number to said number of ports, each of said plurality of rotor channels circumscribing said rotor at a predetermined location;
(b) a plurality of stator channels equal in number to said number of rotor channels, said plurality of stator channels formed in said stator so as to surround said rotor such that one of said stator channels is aligned with each of said rotor channels;
(c) a plurality of rotor ducts formed in said rotor for coupling said plurality of rotor channels to said plurality of ports; and
(d) a plurality of stator ducts formed in said stator for coupling said plurality of stator channels to said hydraulic pressure source.

14. The system claimed in claim 13, wherein said control signals are updated by combining said control signal updates with the present control signals applied to said rotor balancing means.

15. The system claimed in claim 14, wherein said control signal updates are calculated by solving the matrix equation:

$$T\Delta a = -s$$

where:
T is a transfer function matrix that includes said transfer function that models the effect of changes in the control signals applied to said rotor balancing means on the amplitude and phase of said frequency component of said sensed repetitive vibration, said transfer function being a complex number;
s is a complex number vector, said complex number vector including a complex number representing said amplitude and phase of said frequency component; and Δa is a vector of one or more complex numbers, said complex numbers representing the updates for said control signals.

16. The system claimed in claim 12, wherein said control signals are updated by combining said control signal updates with the present control signals applied to said rotor balancing means.

17. The system claimed in claim 16, wherein said control signal updates are calculated by solving the matrix equation:

$$TΔa = -s$$

where:
T is a transfer function matrix that includes said transfer function that models the effect of changes in the control signals applied to said rotor balancing means on the amplitude and phase of said frequency component of said sensed repetitive vibration, said transfer function being a complex number;

s is a complex number vector, said complex number vector including a complex number representing said amplitude and phase of said frequency component; and Δa is a vector of one or more complex numbers, said complex numbers representing the updates for said control signals.

18. The system claimed in claims 1, 2, 6 or 10, wherein said control signals are updated by combining said control signal updates with the present control signals applied to said rotor balancing means.

19. The system claimed in claim 18, wherein said control signal updates are calculated by solving the matrix equation:

$$TΔa = -s$$

where:
T is a transfer function matrix that includes said transfer function that models the effect of changes in the control signals applied to said rotor balancing means on the amplitude and phase of said frequency component of said sensed repetitive vibration, said transfer function being a complex number;

s is a complex number vector, said complex number vector including a complex number representing said amplitude and phase of said frequency component; and Δa is a vector of one or more complex numbers, said complex numbers representing the updates for said control signals.

20. A hydraulic rotor positioner for balancing the rotor of a rotating machine rotating about an axis-of-rotation lying within the stator of said rotating machine, said hydraulic rotor positioner comprising:
(a) a sleeve loosely surrounding said rotor and rotatably mounted in said stator, the space between said sleeve and said rotor defining a continuous volume annular cavity;
(b) a hydrodynamic fluid located in said continuous volume annular cavity; and
(c) a plurality of ports formed in said rotor and opening into said continuous volume annular cavity for supplying fluid to and draining fluid from said cavity.

21. The hydraulic rotor positioner claimed in claim 20, wherein said plurality of ports includes two pairs of opposed ports.

22. The hydraulic positioner claimed in claim 21, wherein said rotor includes a plurality of ducts equal in number to said plurality of ports, one of said ports being located on one end of each of said ducts.

23. The hydraulic rotor positioner claimed in claims 20, 21 or 22, wherein said fluid is a fluid whose viscosity changes in the presence of a magnetic field.

24. The hydraulic rotor positioner claimed in claim 23, wherein said fluid includes particles that have a magnetic orientation such that when said particles are subjected to a magnetic field said particles align with said magnetic field, and wherein said hydraulic rotor positioner includes means for creating a magnetic field in said continuous volume annular cavity.

25. The hydraulic rotor positioner claimed in claims 20, 21, or 22, wherein said fluid is a fluid whose viscosity changes in the presence of an electric field.

26. The hydraulic rotor positioner claimed in claim 25, wherein said fluid includes particles that have an electric orientation such that when said particles are subjected to an electric field said particles align with said electric field, and wherein said hydraulic rotor positioner includes means for creating an electric field in said continuous volume annular cavity.

27. The hydraulic rotor positioner claimed in claim 20, including an elastic bladder mounted in said continuous volume annular cavity.

28. The hydraulic rotor positioner claimed in claim 27, wherein said plurality of ports includes two pairs of opposed ports.

29. The hydraulic positioner claimed in claim 28, wherein said rotor includes a plurality of ducts equal in number to said plurality of ports, one of said ports being located on one end of each of said ducts.

30. The hydraulic rotor positioner claimed in claims 27, 28 or 29, wherein said fluid is a fluid whose viscosity changes in the presence of a magnetic field.

31. The hydraulic rotor positioner claimed in claim 30, wherein said fluid includes particles that have a magnetic orientation such that when said particles are subjected to a magnetic field said particles align with said magnetic field, and wherein said hydraulic rotor positioner includes means for creating a magnetic field in said continuous volume annular cavity.

32. The hydraulic rotor positioner claimed in claims 27, 28 or 29, wherein said fluid is a fluid whose viscosity changes in the presence of an electric field.

33. The hydraulic rotor positioner claimed in claim 32, wherein said fluid includes particles that have an electric orientation such that when said particles are subjected to an electric field said particles align with said electric field, and wherein said hydraulic rotor positioner includes means for creating an electric field in said continuous volume annular cavity.

34. A hydraulic rotor positioner for balancing the rotor of a rotating machine rotating about an axis-of-rotation lying within the stator of said rotating machine, said hydraulic rotor positioner comprising:
(a) a sleeve loosely surrounding said rotor and rotatably mounted in said stator, the space between said sleeve and said rotor defining an annular cavity;
(b) a plurality of enclosed geometrically adjustable devices located in said annular cavity between said rotor and said sleeve;

(c) a hydrostatic fluid located in said plurality of enclosed geometrically adjustable devices; and (d) a plurality of ports formed in said rotor, one of said ports opening into each of said plurality of enclosed geometrically adjustable devices for supplying fluid to and draining fluid from said enclosed geometrically adjustable devices.

35. The hydraulic rotor positioner claimed in claim 34, wherein said enclosed geometrically adjustable devices are elastic bladders.

36. The hydraulic rotor positioner claimed in claim 35, wherein said plurality of ports include two pairs of opposed ports.

37. The hydraulic positioner claimed in claim 36, wherein said rotor includes a plurality of ducts equal in number to said plurality of ports, one of said ports being located on one end of each of said ducts.

38. A hydraulic mass balancer for balancing the rotor of a rotating machine rotating about an axis-of-rotation lying within the stator of said rotating machine, said hydraulic mass balancer comprising:

(a) a plurality of cavities located in said rotor;

(b) a hydrostatic fluid located in said plurality of cavities; and (c) a plurality of ports formed in said rotor, one of said ports opening into each of said plurality of cavities for supplying fluid to and draining fluid from said plurality of cavities.

39. The hydraulic mass balancer claimed in claim 38, wherein said cavities are volume-adjustable.

40. The hydraulic mass balancer claimed in claim 39, wherein said plurality of ports include two pairs of opposed ports.

41. The hydraulic mass balancer claimed in claim 40, wherein said rotor includes a plurality of ducts equal in number to said plurality of ports, one of said ports being located on one end of each of said ducts.

* * * * *